United States Patent
Cardenas-Valencia et al.

(10) Patent No.: US 9,437,906 B2
(45) Date of Patent: Sep. 6, 2016

(54) ELECTRODE MESH GALVANIC CELLS

(71) Applicants: Andres M. Cardenas-Valencia, Tampa, FL (US); Jay Dlutowski, Safety Harbor, FL (US); Melynda C. Calves, Riverview, FL (US); John Bumgarner, Anniston, AL (US); Larry Langebrake, St. Petersburg, FL (US)

(72) Inventors: Andres M. Cardenas-Valencia, Tampa, FL (US); Jay Dlutowski, Safety Harbor, FL (US); Melynda C. Calves, Riverview, FL (US); John Bumgarner, Anniston, AL (US); Larry Langebrake, St. Petersburg, FL (US)

(73) Assignee: University of South Florida, Tampa, FL (US)

( * ) Notice: Subject to any disclaimer, the term of this patent is extended or adjusted under 35 U.S.C. 154(b) by 347 days.

(21) Appl. No.: 14/245,611

(22) Filed: Apr. 4, 2014

(65) Prior Publication Data

US 2014/0302406 A1    Oct. 9, 2014

Related U.S. Application Data

(60) Continuation of application No. 14/015,332, filed on Aug. 30, 2013, now Pat. No. 8,715,370, which is a continuation of application No. 12/896,325, filed on Oct. 1, 2010, now Pat. No. 8,597,821, which is a division of application No. 11/468,115, filed on Aug. 29, 2006, now Pat. No. 7,829,215.

(60) Provisional application No. 60/596,071, filed on Aug. 29, 2005.

(51) Int. Cl.
| | | |
|---|---|---|
| H01M 12/02 | (2006.01) | |
| H01M 6/40 | (2006.01) | |
| H01M 12/08 | (2006.01) | |
| H01M 4/88 | (2006.01) | |
| H01M 12/04 | (2006.01) | |
| H01M 4/04 | (2006.01) | |
| H01M 4/38 | (2006.01) | |
| H01M 12/06 | (2006.01) | |

(Continued)

(52) U.S. Cl.
CPC .......... *H01M 12/02* (2013.01); *H01M 4/0426* (2013.01); *H01M 4/0473* (2013.01); *H01M 4/0492* (2013.01); *H01M 4/38* (2013.01); *H01M 4/8825* (2013.01); *H01M 4/8878* (2013.01); *H01M 6/40* (2013.01); *H01M 12/04* (2013.01); *H01M 12/065* (2013.01); *H01M 12/08* (2013.01); *H01M 4/134* (2013.01); *H01M 4/92* (2013.01); *Y10T 29/49115* (2015.01)

(58) Field of Classification Search
CPC ................. H01M 6/42; H01M 12/06–12/065
See application file for complete search history.

(56) References Cited

U.S. PATENT DOCUMENTS

| | | |
|---|---|---|
| 3,664,878 A | 5/1972 | Amthor |
| 4,178,418 A | 12/1979 | Croset et al. |

(Continued)

OTHER PUBLICATIONS

International Search Report for. PCT/US06/33742 (filing date Aug. 29, 2006) with a mailing date of Jul. 29, 2008; Applicant: University of South Florida et al.

*Primary Examiner* — Maria J Laios
*Assistant Examiner* — Robert S. Carrico
(74) *Attorney, Agent, or Firm* — Molly L. Sauter; Smith & Hopen, P.A.

(57) ABSTRACT

The present invention is directed to the fabrication of thin aluminum anode batteries using a highly reproducible process that enables high volume manufacturing of the galvanic cells. A thin aluminum anode galvanic cell having a meshed structure is provided which includes a catalytic metal layer positioned on a patterned silicon substrate, an etched dielectric layer positioned to cover the catalytic metal layer, the catalytic metal layer serving as an etch stop for the etched dielectric layer and an etched aluminum layer positioned to cover the dielectric layer, the dielectric layer serving as an etch stop for the etched aluminum layer.

9 Claims, 9 Drawing Sheets

(51) Int. Cl.
*H01M 4/92* (2006.01)
*H01M 4/134* (2010.01)

(56) References Cited

U.S. PATENT DOCUMENTS

| | | | |
|---|---|---|---|
| 4,668,374 A | 5/1987 | Bhagat et al. | |
| 5,660,971 A | 8/1997 | Kobayashi et al. | |
| 6,664,122 B1 | 12/2003 | Andryuschenko et al. | |
| 6,861,170 B2 * | 3/2005 | Lewis, Jr. | H01M 4/244 429/163 |
| 2003/0116865 A1 | 6/2003 | Yamaguchi et al. | |
| 2003/0152815 A1 * | 8/2003 | LaFollette | H01M 2/0202 429/7 |
| 2003/0203583 A1 | 10/2003 | Malik | |
| 2004/0018424 A1 | 1/2004 | Zhang et al. | |
| 2004/0063237 A1 | 4/2004 | Yun et al. | |
| 2004/0115520 A1 | 6/2004 | Cardenas-Valencia et al. | |
| 2005/0118827 A1 | 6/2005 | Sato et al. | |
| 2005/0158619 A1 | 7/2005 | Honda et al. | |
| 2006/0063051 A1 * | 3/2006 | Jang | H01M 4/36 429/406 |

* cited by examiner

ELECTRODE MESH GALVANIC CELLS

CROSS REFERENCE TO RELATED APPLICATIONS

This application claims priority to currently pending U.S. patent application Ser. No. 14/015,332, entitled, "Method for the Fabrication of Electrolyte Cavities Using Bulk Micro-Machining", filed Aug. 30, 2013, which claims priority to U.S. Pat. No. 8,597,821, entitled, "Surface Micromachined Electrolyte-Cavities for use in Micro-Aluminum Galvanic Cells", filed Oct. 1, 2010, which claims priority to U.S. Pat. No. 7,829,215, entitled, "Surface Micromachined Electrolyte-Cavities for use in Micro-Aluminum Galvanic Cells", filed Aug. 29, 2006, which claims priority to U.S. Provisional Patent Application 60/596,071, entitled, "Micro-Aluminum Galvanic Cells and Method for Constructing the Same", filed Aug. 29, 2005.

STATEMENT OF GOVERNMENT INTEREST

This invention was made with Government support under Grant No. DASG60-00-C-0089 awarded by the U.S. Army Space and Missile Defense Command. The Government has certain rights in the invention.

BACKGROUND OF THE INVENTION

Aluminum galvanic cells, also commonly known as fuel or semi-fuel cells, provide mechanical systems. System integration of power sources of this kind makes possible the development of sensors that can be deployed in the field.

One of the most claimed advantages of MEMS systems is the low energy requirement. So, these MEMS fabricated cells with higher energetic capacities can potentially power several of these micro-systems components, enabling the development of complex sampling schemes. The cells can be activated on demand, which eliminates the time-degradation performance common to commercial available batteries. The cells can be disposable (depending on the actuation type) and can be activated on demand and can provide a very long on-the-shelf life. System integration of both portable and disposable analytical/sensing systems benefit from this simple power source.

Fabrication methods for these aluminum galvanic thin cells are known in the art. However, the prior art methods utilize unsophisticated manufacturing techniques, such as staking and gluing layers. These techniques are difficult to duplicate in a mass fabrication environment Accordingly, what is needed in the art is a highly manufacturable process for the fabrication of high-energy micro-aluminum galvanic cells.

SUMMARY OF INVENTION

In accordance with the present invention, a method to fabricate thin aluminum anode batteries using a highly reproducible process that enables high volume manufacturing of the galvanic cells is described.

In accordance with a particular embodiment, semiconductor fabrication methods are used to fabricate the thin aluminum galvanic cells in accordance with the present invention. In a particular embodiment, a catalytic material to be used as the cathode is deposited on a substrate. An insulating spacing material is deposited on the cathode and patterned using photolithography. This insulating spacing material can be either used as a sacrificial layer to expose the electrodes or serve as a support for one of the electrodes. Similarly, the aluminum anode may be deposited and patterned on another substrate and bonded to the first substrate, or can be deposited directly on the insulating material prior to patterning. The cell is packaged using standard techniques and connected to a delivery system to provide delivery of the electrolyte when activation of the cell is desired.

In a particular embodiment, a thin aluminum anode galvanic cell is fabricated on a silicon wafer having a catalytic metal layer positioned on a patterned silicon substrate to form an electrode mesh, a dielectric layer positioned to cover the catalytic metal mesh layer and an aluminum layer positioned to cover the dielectric layer. In a specific embodiment of this galvanic cell, the catalytic metal is platinum and the galvanic cell further includes a titanium nitride adhesive layer positioned between the patterned silicon substrate and the platinum layer. In a specific embodiment, the platinum layer is about 100 nm thick, the titanium nitride layer is about 10 nm thick, and the aluminum layer is about 300 nm thick.

In an additional embodiment, a thin aluminum anode galvanic cell on a silicon wafer is provided having a recess formed in the silicon wafer, the recess having three sidewalls, a catalytic metal layer positioned on the bottom of the recess and an aluminum foil layer positioned in overlying relation to contact the three sidewalls of the recess, thereby forming the galvanic cell. In a particular embodiment of this galvanic cell, the catalytic metal layer is a platinum layer, and a titanium nitride layer is positioned between the silicon water and the platinum layer. In a specific embodiment, the platinum layer is about 100 nm thick, the titanium nitride layer is about 10 nm thick and the aluminum foil layer is about 100 μm thick.

In yet another embodiment, a thin aluminum anode galvanic cell is provided having a first substrate comprising a catalytic layer and a BCB layer, the BCB layer forming the walls of a reservoir on the surface of the catalytic layer and a second substrate comprising an aluminum layer and bonded to the first substrate such that a galvanic cell is formed bounded by the catalytic layer, the aluminum layer and the BCB layer forming the walls of the reservoir.

The thin batteries manufactured in accordance with the methods of the present invention are capable of delivering a substantial amount of energy for their size, per unit weight when compared to larger batteries, during specific intervals of time. While the aluminum galvanic cells do not provide as high of a voltage as other systems known in the art, such as lithium cells, they are capable of considerably higher current densities. Larger voltages can be achieved if high currents are available. Additionally, the materials used in the manufacturing process of the cells are environmentally inert materials.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

In an exemplary embodiment, a fabrication method for fabricating very thin (MEMS) aluminum anode galvanic cells in accordance with the present invention is described. The fabrication steps are based on, but not limited to, conventional semi-conductor industry methodologies.

Figure 1:
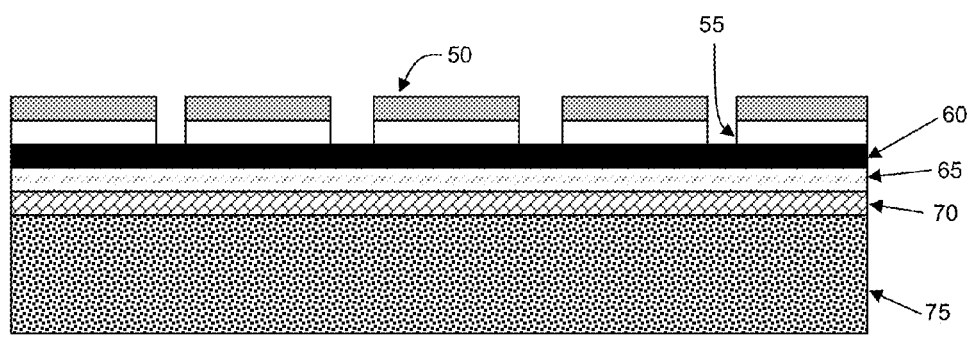
FIG. 1 is an illustration of a galvanic cell in accordance with the present invention.

With reference to FIG. 1, an exemplary embodiment to fabricate the thin aluminum anode batteries using a highly reproducible process that enables high volume manufacturing of the galvanic cells is illustrated. In accordance with this embodiment, semiconductor fabrication methods are used to fabricate the thin aluminum galvanic cells in accordance with the present invention. In a particular embodiment, a catalytic material to be used as the cathode 60 is deposited on a substrate 75. An insulating spacing material 55 is deposited on the cathode 60 and patterned using photolithography. This insulating spacing material 55 can be either used as a sacrificial layer to expose the electrodes or serve as a support for one of the electrodes. Similarly, the aluminum anode 50 may be deposited and patterned on another substrate and bonded to the first substrate 75, or can be deposited directly on the insulating material 55 prior to patterning. In this exemplary embodiment, the silicon nitride passivation layer 70 and adhesion layer 65 are illustrated. The adhesion layer 65 may be titanium nitride, aluminum nitride, silicon, or silicon dioxide. The cell is then packaged using standard techniques and connected to a delivery system to provide delivery of the electrolyte when activation of the cell is desired.

In an exemplary embodiment illustrating the fabrication process in accordance with the present invention is provided. A first step in the fabrication process of the galvanic cell involves the deposition of a metal, on a substrate forming the cathode collector of the galvanic cell in a particular embodiment, platinum is used as the depositing metal and a silicon wafer is used as the substrate. However, it is within the scope of the present invention to utilize other metals with different degrees of efficiency. Silver, for instance provides similar results to platinum, nickel, copper and other known catalytic metals can be used only limited by the reactivity with the chosen electrolyte. Next, aluminum metal is deposited to constitute the cells' anodes. This metal can be deposited on a substrate through various methods, including, but not limited to, e-beam evaporation, and plasma physical vapor deposition. Alternatively a thin aluminum plate or foil can be used as an anode. Both anode and cathode substrates should provide means for collecting the electric current. With this embodiment, the anode and cathode separation ranges from submicron to micron dimensions (MEMS batteries). The cells may additionally be fabricated in a meshed configuration in which the cells are built vertically on the substrate.

The coating of a dielectric (ceramics, or polymeric materials are suited for this purpose) that separates the cell's electrodes is further included within the scope of the invention. This separating material can be first coated to either one of the substrates or simply placed in between the electrodes and be able to bond at contact or by either applying pressure or temperature.

The optional step of patterning the deposition of the metals to the substrates, either via sacrificial etching or lift off techniques, or the separating dielectric is considered and exemplified here. An important result from the patterning of the metals arises from seeking a more efficient chemical reaction resulting in more energy provided per mass or volume of reagents. The bonding of the layers using a patterned separating material forms a micro-fluidic reservoir that will contain the electrolyte. However, in an additional embodiment, batteries can be fabricated and a reservoir patterned substrate layer can be subsequently bonded to them.

In accordance with the present invention, three particular embodiments for producing the micro cells are presented. These methods include: (1) Fabrication Process for the Production of Meshed Cells, (2) Fabrication Process for Cells with Electrolyte-cavities via bulk micro-machining, and (3) Fabrication Process for Cells with Electrolyte-cavities via surface micromachining.

Figure 2:
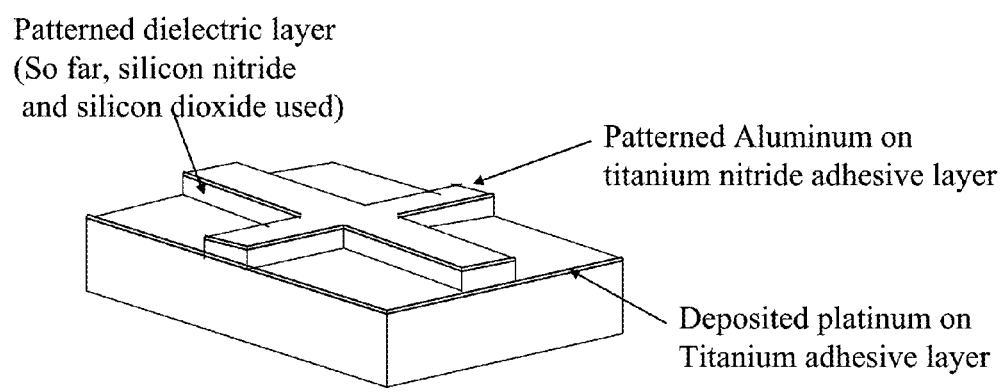
FIG. 2 is a diagrammatic view of fabricated meshed cells in accordance with the present invention.

Exemplary Embodiment (I) Fabrication Process for the Production of Meshed Cells In a particular embodiment of the invention, a process for the production of meshed cells is provided. With reference to FIG. 2, in accordance with this embodiment, the process begins with <100>, 100 mm diameter silicon wafers 80. The crystal orientation and doping concentration is inconsequential to device operation. The wafers 80 were cleaned with acetone, followed by methanol and deionized water and spun dry. A low stress, 300 nm thick silicon nitride layer 85 was then deposited in a Tystar LPCVD furnace (Torrance, Calif.), at 835° C. for 60 minutes with $NH_3$ flow rate of 20 scm/min. Negative photoresist (NR9-1000PY, acquired from Futurrex, Inc, Franklin, NJ) was then spun onto the wafer at 3000 RPM for 40 seconds, followed by a 150° C. pre-bake for 1 minute. Using a mask created to pattern the platinum electrodes and EVG alignment system, the photoresist was exposed for 11 seconds, followed immediately by a post exposure bake at 100° C. for 1 minute. After allowing the wafer a small amount of time to cool, the resist was developed in RD-6 photoresist developer. After rinsing and spilling dry, the wafer was subjected to another minute at 100° C. to drive out any moisture associated with the development process.

Using an AJA International model ATC 1800 sputtering system, a 10 nm titanium nitride layer 90 was deposited. In an exemplary embodiment, deposition time was 3 minutes with RF power set at 360 W, argon flow rate at 29.4 scm/min, nitrogen flow at 2.6 scm/min and chamber pressure set at 2 mTorr. It is shown that this portion of the process can be modified to test different adhesion layers. Alternative adhesion layers successfully tested were silicon and aluminum nitride.

Following the deposition of the adhesion layer 90, a 100 nm-thick layer of platinum 95 was deposited using the in-house sputtering system for 4 minutes. Flow rate was 30 scm/min for argon at a pressure of 2 mTorr. Liftoff of the platinum 95 was performed using 1165 photoresist stripper at 80° C., to pattern the active battery areas. Liftoff times were 15 minutes for the wafers with the silicon adhesion layers, 2.0 minutes for the wafer with the titaninum nitride adhesion layer 90 and over 90 minutes for the wafer with aluminum nitride. Upon completion of the liftoff process, the wafer was cleaned with isopropanol and deionized water and spun dry.

An alternative to the liftoff process is an etching processing (As it will be explained for aluminum patterning in the $2^{nd}$ type of cells: Electrolyte reservoir cells). This type of processing requires the deposition of the metals prior to applying and developing photoresist. Either a negative image of the mask used, or a positive resist would be required to properly pattern the electrodes. The wafers would be placed in platinum etchant for the amount of time recommended by the manufacturer. If a conductive adhesion layer is used, this would require an additional etch step, followed by the appropriate rinse and spin dry.

Next, a 500 nm silicon dioxide layer 85 was deposited in a Unaxis (Osaka, Japan) 790 PECVD (plasma enhanced chemical vapor deposition) system using a standard recipe for oxide deposition. Substrate temperature was 250° C. and deposition occurred for 10.5 minutes. The substrate was cooled to 150° C. prior to removing from the chamber. Cells have also been fabricated using silicon nitride as this dielectric layer using the same equipment (with different gases) as described for the silicon dioxide layer.

Using the in-house sputtering system, aluminum 100 was deposited. Again, argon flow rate was 30 scm/min. Deposition time was 30 minutes. Aluminum thickness was measured to be 300 nm±10% after the etch step using a profilimeter. Following aluminum deposition, positive photoresist (Shipley 1813) was spun onto the wafer at 3000 RPM for 40 seconds, followed by a 1 minute bake at 90° C. The pattern was aligned and exposed for 1.8 seconds, then developed for 40 seconds in MF 319. The wafer was then rinsed in deionized water and spun dry. The aluminum was etched in aluminum etchant for 8 minutes, constantly agitated. Upon completion of the etching step, the wafer was rinsed with deionized water and spun dry. The photo resist was then removed using Shipley 1165 photoresist stripper at 80° C. for 8 minutes, followed by rinse with isoproponal and deionized water and spun dry. Additionally, the photoresist can be removed by spinning at 3000 rpm for 40 seconds with acetone followed by methanol.

Alternatively, aluminum 100 can be deposited using an electron beam evaporation system, producing thicker layers of aluminum for a given processing time.

The oxide was etched in a Unaxis 790 RIE (reactive ion etching) system using a standard recipe for oxide etching. Etch time was 13 minutes. The platinum electrode acted as an etch stop and the aluminum electrode acted as a mask, preserving the oxide directly under the aluminum electrode. The resulting devices had a total electrode area of 1 $cm^2$ each.

Figure 3:
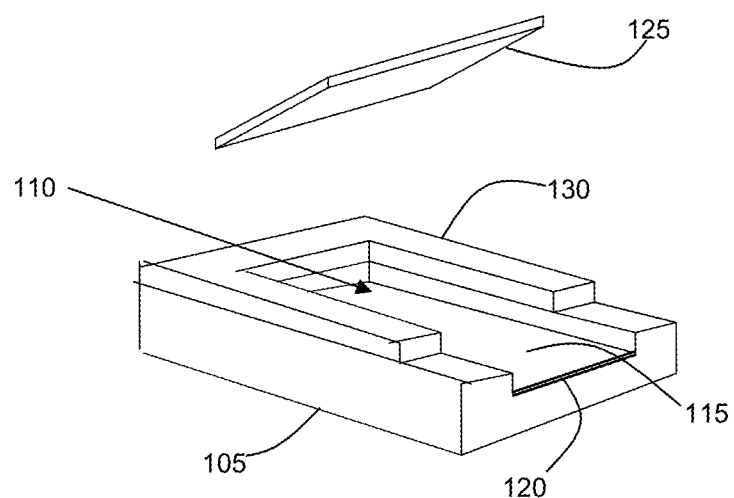
FIG. 3 is a diagrammatic view of fabricated cells with electrolyte-cavities manufactured via bulk micro-machining in accordance with the present invention.

Exemplary Embodiment (2) Fabrication Process for Cells with Electrolyte-Cavities Via Bulk Micro-Machining The process begins with <100>, 100 mm diameter silicon wafers 105, (Siltron Inc. Korea). The crystal orientation and doping concentration is inconsequential to device operation. The wafers 105 were cleaned with acetone, followed by methanol and deionized water and spun dry, (a spinner model WS-400B-6NPP/Lite acquired from Laurell Corp, North West, PA, was used). In this case a recess 110 is formed in the silicon wafer 80. At the bottom of this recess 110 platinum 115 is deposited and aluminum foil 125 is subsequently glued to the wafer via a double side sticky tape 130, as shown with reference to FIG. 3.

The recess 110 is formed via etching, while silicon nitride is used as the mask. The first step is then the deposition of a low stress, 300 nm thick silicon nitride layer was deposited in a Tystar LPCVD furnace (Torrance, Calif.), at 835° C. for 60 minutes with NH3 flow rate of 20 scm/min. Once the silicon nitride layer covers the whole wafer this material is patterned using a Laser micromachining tool. Alternatively, the nitride can be patterned and etched either chemically or in a plasma etcher.

Chemical etching is used to form the recess 110 on the silicon wafer 80. A 45% solution of potassium hydroxide at 80 C of temperature is used. The immersion in this solution lasted for approximately 25 minutes. The total height is about 100 um. Once the recess 110 is formed a platinum "liftoff" process deposits a 100-um thick layer on the bottom of the recess. The word liftoff is in quotation marks as a traditional photo resist was not employed. Instead, kapton tape is placed around the formed recess 110. As an alternative to the chemical etching and silicon nitride mask, a standard photo-resist can be used in conjunction with a RIE or DRIE machine with the appropriate recipes to create the recess.

Then the platinum deposition takes place. First a 10 nm-thick titanium nitride layer 120 was deposited to improve the platinum adhesion to the silicon wafer using an AJA International (North Scituate, MA) model ATC 1800 sputtering system. Deposition time was 3 minutes with RF power set at 360 W, argon flow rate at 29.4 scm/min, nitrogen flow at 2.6 scm/min and chamber pressure set at 2 mTorr. Subsequently, a 100 nm-thick layer of platinum 115 was deposited using the in-house sputtering system for 4 minutes using an in-house built sputtering system. The tape is removed, leaving the metals only in the cavity 110.

High purity (99.999%) 100-um thick aluminum 125 (acquired from Alfa Aesar) is cut into pieces, with dimensions such that 1 $cm^2$ of aluminum area is directly exposed to the platinum. Contact was made to the Pt and Al electrodes using metallic pins, now shown. Electrolyte was introduced to the cavity 110 using a syringe.

Figure 4:
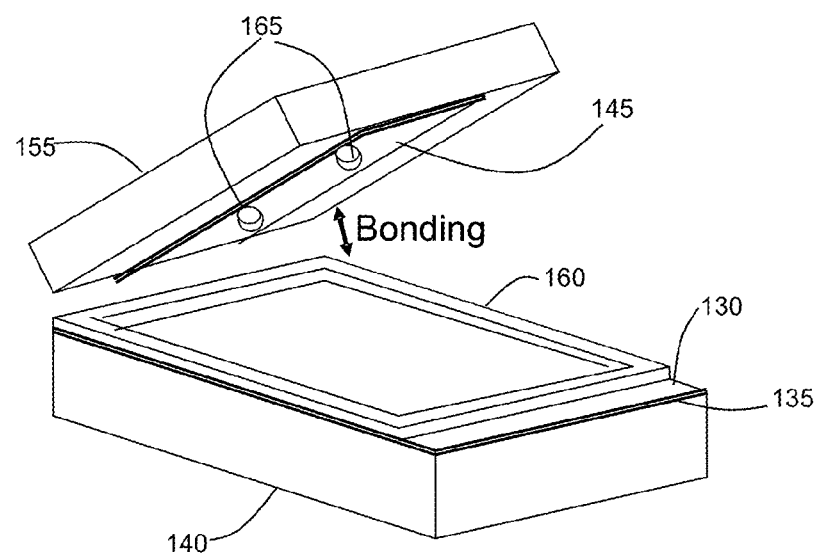
FIG. 4 is a diagrammatic view fabricated cells with electrolyte-cavities manufactured via surface micromachining in accordance with the present invention.

Exemplary Embodiment (3) Fabrication Process for Cells with Electrolyte-Cavities Via Surface Micromachining In accordance with this embodiment as shown with reference to FIG. 4, platinum 130 was deposited on single side polished prime, 4 inch-diameter, 500 um-thick silicon wafers 140. Aluminum 145 is deposited on 4 inch-diameter, 500 um-thick, glass wafers 155 to allow for visualization of the cell at the time of filling. Cells have also been fabricated using silicon wafers as a substrate on which the aluminum anodes are patterned. The aluminum 145 and platinum 130 deposition conditions are similar to those described in the meshed cells. For both cases titanium nitride 135, 150 is used as the adhesion layer. A 100 nm thick layer of platinum 130 was deposited on one of the wafers 140. After the platinum 130 is deposited, a small area of the wafer is cut (or cleaved) on the side. This small cut on the platinum wafer will offer an exposed area of the aluminum, which will serve as an electrical contact point.

Aluminum 145 was deposited using a PVDX 1800 evaporation system (AJA International, North Scituate, MA). The deposition took place at a pressure of $4 \times 10^{-6}$ torr at a 7.0 kV potential and a current of 480 mamps. A 25 minute-long deposition was employed to obtain a 1.4 um-thick high purity aluminum deposit. Puratronic© 4-8 mm aluminum (purity of 99.999%) shot acquired from Alfa Aesar (Ward Hill, MA) was used. The aluminum 145 is etched to cover an area slightly smaller than that encircled by the benzocyclobutene layer (BCB) 160, to ensure a good liquid sealed, as shown in FIG. 4. This helps prevent the delamination of the cell when the aluminum etches away upon cell activation. The patterning of the aluminum was done by selective etching. Positive photo resist (S1813, from Shipley Co, Freeport NY), was used. The resist is applied on the wafer, spun at 3000 rpm for 40 second and the hot-plate baked for 1 minute. The photo-resist is then exposed in an EV 620 aligner (EVG, Schärding, Austria) for 2.5 seconds, MF 319 is used as developer. A 30-minute-long immersion of the patterned wafer was necessary to etch completely the aluminum in the exposed areas. Type-A aluminum etchant (Transene Co, Danvers, Mass.) at room temperature was used to pattern the aluminum.

Figure 5:
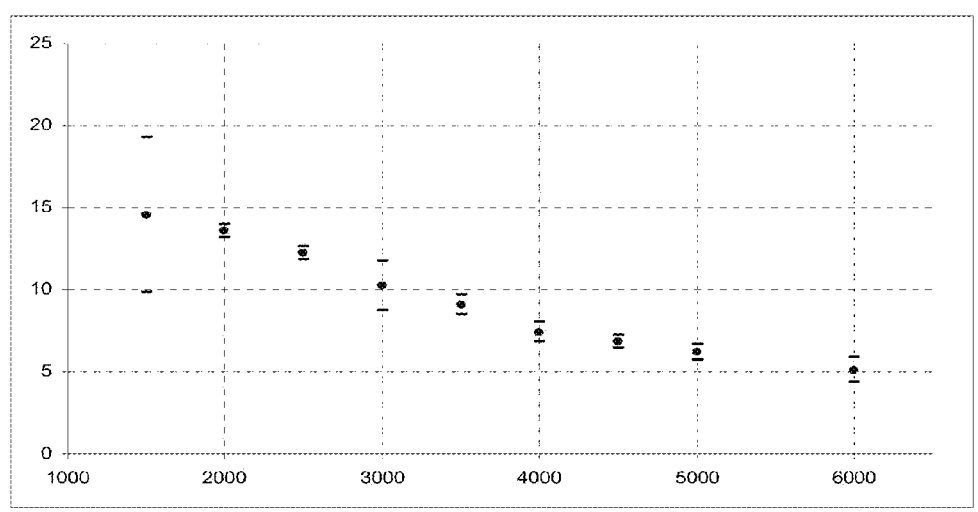
FIG. 5 is a graphical representation of the achieved thicknesses after soft-bake for patterned BCB. Error bars are generated as plus minus twice the standard deviation
Figure 6:
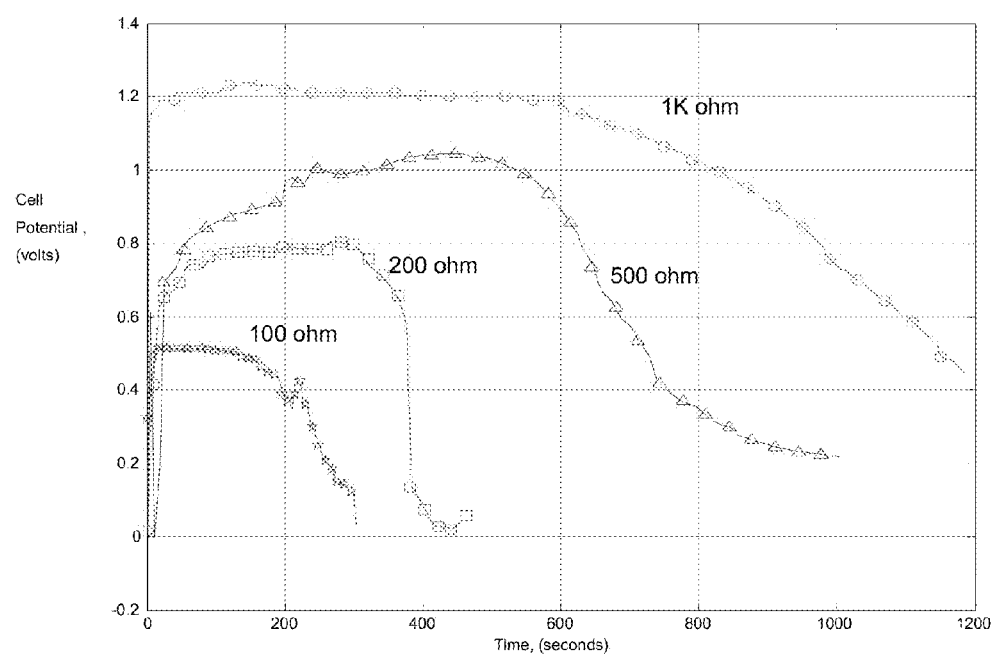
FIG. 6 is a graph illustrating exemplary data at different loads for the meshed cells in accordance with the present invention, including 1 K ohm, 500 ohm 200 ohm and 100 ohms.
Figure 7:
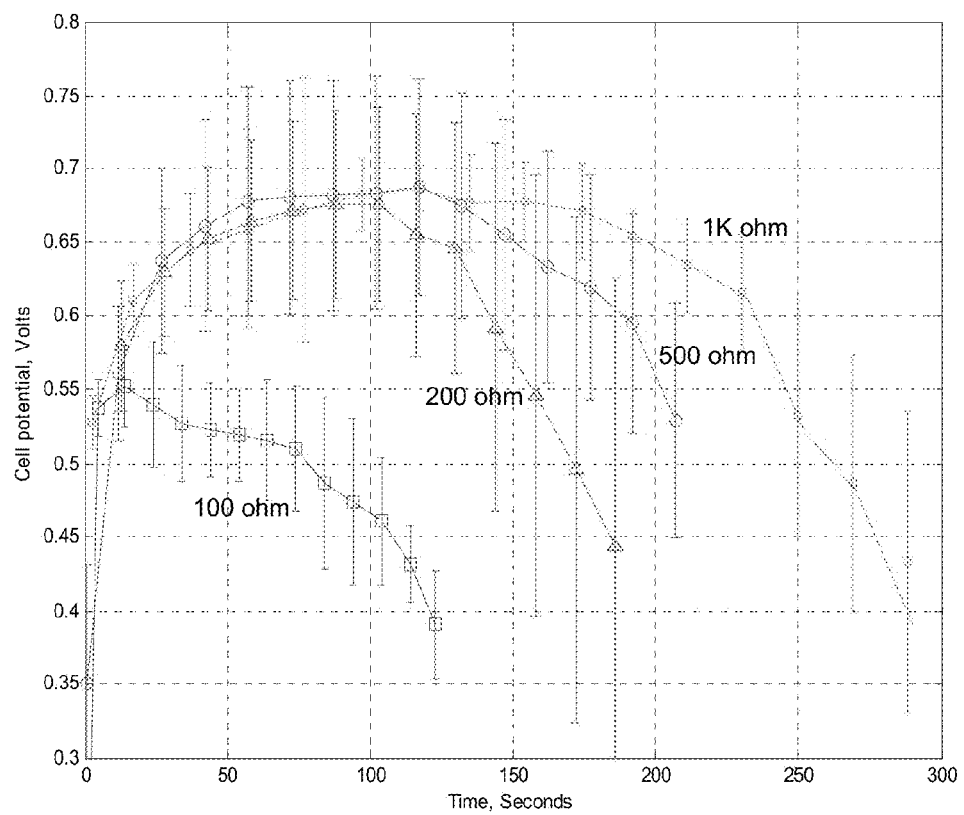
FIG. 7 is a graph illustrating the potential as a function of time for 4 different chemistry recipes tested in accordance with the present invention. Results for cells with platinum to aluminum area ratio of 4 are illustrated.
Figure 8:
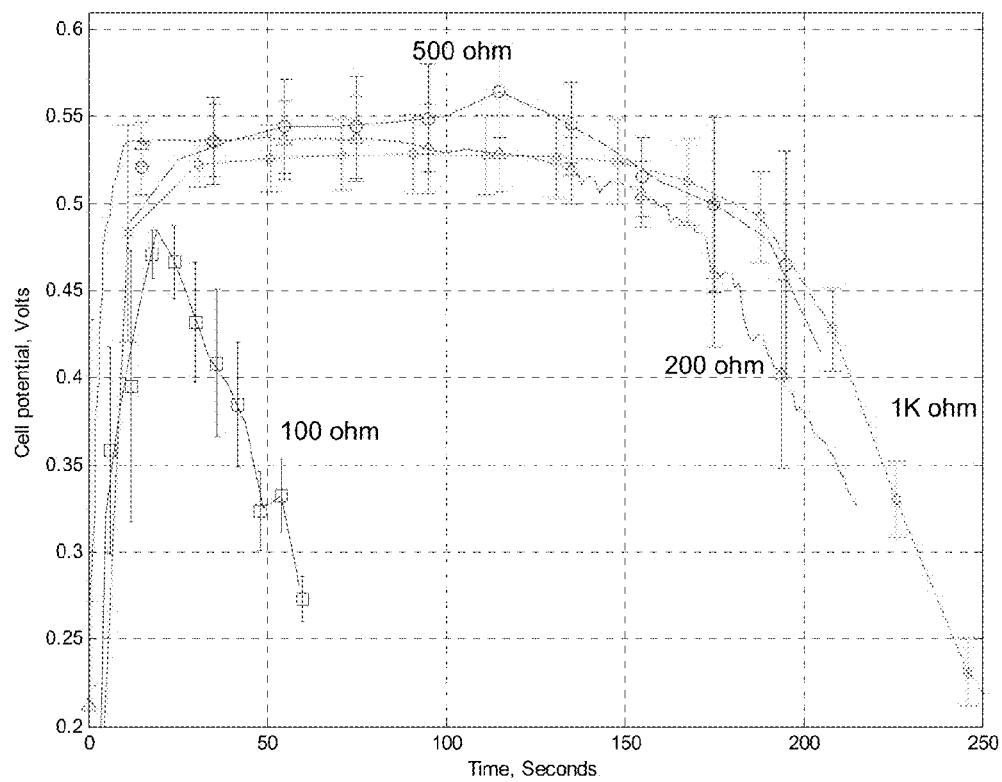
FIG. 8 is a graphical illustration of the potential as a function of time for 4 different chemistry recipes tested in accordance with the present invention. Results for cells with platinum to aluminum area ratio of 9 are illustrated.
Figure 9:
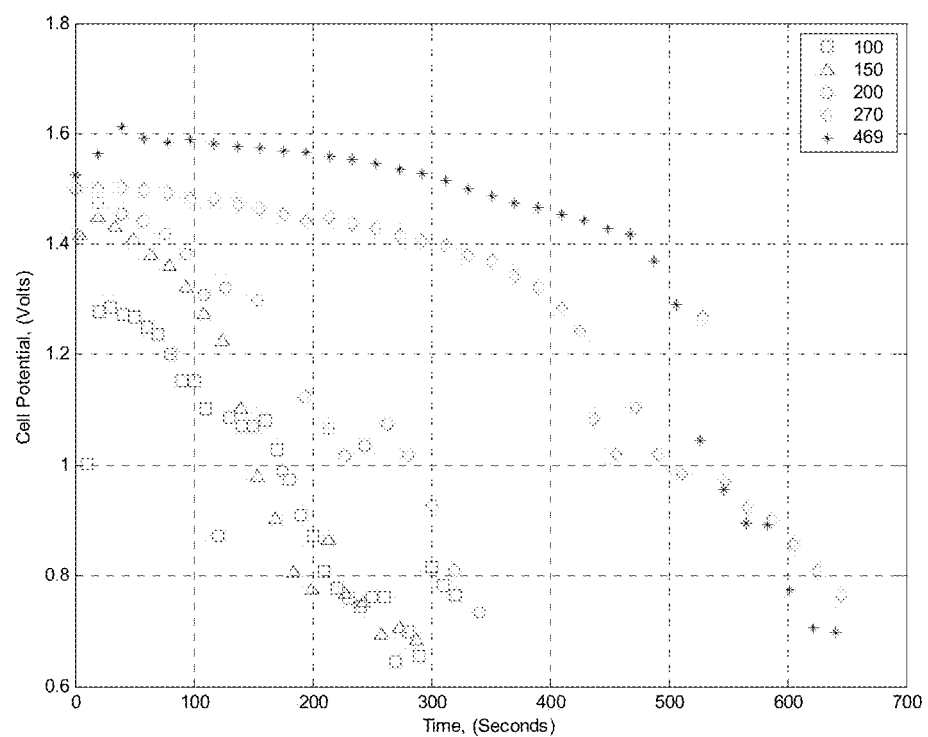
FIG. 9 is a graphical illustration of the cell potentials as a function of time at various loads for 1 $cm^2$ micro-aluminum galvanic cells in accordance with the present invention

The BCB 160 procedure basis for patterning was guided by the manufacturer recommendations [www.cyclotene.com]. The BCB (Cyclotene resin 4026 was acquired from Dow Chemical Co.) was deposited and patterned on the platinum side. The wafers' surfaces are cleaned by applying acetone immediately followed by methanol application while the wafers are rotating to free the Platinum surface from any organic residues and particles. The spinning was performed in a WS-400B-6NPP/Lite spinner (Lauren Corp, North West, Pa.). Then adhesion promoter is applied (AP3000) statically while wafer on spinner; spread it by lightly moving the chuck. The promoter is allowed to interact with the wafer for 30 seconds. The wafers are then spun-dry at 3000 rpm for 15 seconds. The wafers with the AP3000 residue were then baked at 125° C. for 30 seconds. The BCB is applied on the wafer, while the wafer is motionless on the chuck. The resin is spread by rotating the spinner at 700 rpm during approx 10 seconds. The spinner speed was varied depending on the desired BCB thickness for 30 seconds. Achieved thicknesses after soft-bake for patterned BCB are shown with reference to FIG. 5. Error bars are generated as plus minus twice the standard deviation After BCB-resin is applied a hot-plate bake (Delta 20T2 3LE) was performed to partially harden the resin before exposure. Cyclotene is a photo-negative resin so light-field masks were prepared to expose the polymer areas that are to form the walls of the reservoirs. Masks were drawn using Coventor software and printed in transparency millard paper (at Precision Images, Largo, Fla.).The resin was allowed to cool down before exposure. Exposure is a function of the film thickness. For 4026 resin, the manufacturer's recommended exposure dose is 60 mJ/cm2/um. An EV-620 photo lithographic system was used that provided an irradiance of 15 mW/cm2. Before developing an oven soft-bake was recommended. It was found that the development process was greatly enhanced by performing this oven (Ultra clean 100 In Line Instruments) bake for 10 minutes. The temperatures are shown below in table 1.

TABLE 1

Pre-bake and pre-develop bake temperatures for deposited BCB of various thicknesses.

| | After softbake thickness, μm | | | | | | |
|---|---|---|---|---|---|---|---|
| | <4.6 | 4.6-6.6 | 6.7-8.7 | 8.8-10 | 10.1-11.4 | 11.5-15.6 | >15.6 |
| Hot-plate prebake temperature, ° C. | 60 | 65 | 70 | 75 | 80 | 85 | 90 |
| Oven predevelope bake temperature, ° C. | 50 | 55 | 60 | 65 | 70 | 75 | 80 |

The wafers were then developed while in movement using the puddle development technique using DS2100 as the developer. Wafers were placed on spinner and while spinning (700 rpm), developer was added drop by drop during 10 seconds, followed by an immediate spun dried at 3000 rpm for 30 seconds. This procedure is repeated several times. When spinning at 1500 rpm, which results on a BCB 160 thickness of 20 um, the development procedure is repeated five times. A spinning speed of 3000 rpm produces a BCB 160 thickness of approximately 10 um and requires only repetition of the development procedure three times. Wafers are then placed in a plasma etcher (M4L Tepla) to remove the remaining polymer covering the wafer's clear areas exposing the metals. A one-minute etching time was sufficient for the processing procedure described above. The etching gas recipe used kept the Dow's recommended ratio of 80:20 O2/CF4.

The bonding of the processed wafers was then performed using a EV501 (EVG, Schärding, Austria) wafer-to-wafer bonder. The platinum wafer 140 with the patterned BCB 160 is placed on the wafer holder. The aluminum-wafer 155 is then coated with adhesion promoter as done with the platinum wafer as described above. The aluminum wafer is then placed on top of this one, making sure that the wafers are aligned so a portion of the metals are easily access to serve as electrical contacts. Alternatively, alignment marks can be used with the EV-620 alignment system to align the wafers. In the case of the bonding of two silicon wafers the holes 165 previously made serve to make sure the ports would permit the electrolyte filling. In the case of the glass mask it is easily to optically align the masks.

Flags are placed to separate the wafers. The bonding chamber is then closed and the sequence is initiated. The following steps comprise the bonding sequence: (1) The vacuum pump extracts the air from the chamber until a pressure of $1 \times 10^{-2}$ mbar is reached. The top and bottom plates are then heated to a temperature of 160° C., and it is held for 5 minutes. This step is to minimize overshoot for the next step. Then more heating until the plates are brought up to 205° C. is required. This temperature is held there during 30 minutes. This long period of time is necessary, as this temperature brings the polymer to a temperature at which it softens eliminating the possibility of formation of small cracks in the polymers surface. After that the wafer is bow (starts bonding from the center), the flags are taken out and the piston is held down using a force of 900 N. The system is then purged to a pressure of $5 \times 10^{-4}$ mbars. This low pressure ensures that low concentrations of oxygen, which inhibits the polymerization reaction, are present while the resin cures. The wafers are then heated up to 230° C. and held there for 30 minutes to ensure the curing of the resin.

The metal deposition and combination of patterning and bonding optimization on the wafers using BCB as described are exemplary in nature. Other combinations are within the scope of the present invention.

In an additional embodiment, ports for injecting electrolyte into the cells are provided to enable the activation of the galvanic cells utilizing an appropriate electrolyte.

In accordance with the present invention, the cell fabrication methods presented ensure that the electrodes distance is very small, thus minimizing over polarizations due to ion transport. This has allowed us to use simple electrolyte formulations. No extra additives have been utilized in the formulations for which the corresponding data is presented, but this possibility may further enhance the cell performance.

Exemplary data resulting from the fabricated cells in accordance with the present invention are illustrated with reference to FIG. 6-FIG. 9.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A thin aluminum anode galvanic cell on a silicon wafer, the cell comprising:
   a catalytic metal layer positioned on a patterned silicon substrate;
   an etched dielectric layer positioned to cover the catalytic metal layer, the catalytic metal layer serving as an etch stop for the etched dielectric layer; and
   an etched aluminum layer positioned to cover the dielectric layer, the dielectric layer serving as an etch stop for the etched aluminum layer.

2. The galvanic cell of claim 1, further comprising an adhesive layer positioned between the patterned silicon substrate and the catalytic metal layer.

3. The galvanic cell of claim 2, wherein the adhesive layer is selected from the group consisting of titanium nitride, silicon nitride and aluminum nitride.

4. The galvanic cell of claim 2, wherein the adhesive layer is a layer of titanium nitride that is about 10 nm thick.

5. The galvanic cell of claim 1, wherein the catalytic metal layer is selected from the group consisting of silver, platinum, nickel and copper.

6. The galvanic cell of claim 1, wherein the catalytic metal layer is layer of platinum that is about 100 nm thick.

7. The galvanic cell of claim 1, wherein the dielectric layer is a silicon dioxide layer.

8. The galvanic cell of claim 1, wherein the dielectric layer is a silicon nitride layer.

9. The galvanic cell of claim 1, wherein the aluminum layer is about 300 nm thick.

\* \* \* \* \*